United States Patent [19]

McIntosh et al.

[11] Patent Number: 4,603,901
[45] Date of Patent: Aug. 5, 1986

[54] LIFTABLE TOP FOR PICKUP TRUCKS

[76] Inventors: Kenneth B. McIntosh, Rte. 1, Box 479, Rockvale, Tenn. 37153; Clyde Howard, Rte. 11, Sulphur Springs Rd., Murfreesboro, Tenn. 37130

[21] Appl. No.: 682,860

[22] Filed: Dec. 18, 1984

[51] Int. Cl.$^4$ .............................................. B60P 3/34
[52] U.S. Cl. .................... 296/165; 296/172; 296/176; 296/26; 296/27
[58] Field of Search ............ 296/26, 27, 100, 165, 296/10, 172, 176

[56] References Cited

U.S. PATENT DOCUMENTS

| | | | |
|---|---|---|---|
| 3,061,358 | 10/1962 | Lien | 296/26 |
| 3,151,908 | 10/1964 | Horst | 296/100 |
| 3,286,414 | 11/1966 | Harrison et al. | 296/26 |
| 3,519,306 | 7/1970 | Young | 296/27 |
| 4,392,682 | 7/1983 | Norkus, Jr. | 296/26 |
| 4,448,453 | 5/1984 | Irelan et al. | 296/27 |

*Primary Examiner*—Robert R. Song
*Attorney, Agent, or Firm*—B. P. Fishburne, Jr.

[57] ABSTRACT

To facilitate handling cargo while standing erect, the camper top of a pickup truck cargo box is held by power-operated screw jacks which are installed in existing side board mounts of the cargo box. The provision of side curtains on the camper top allows conversion to a true recreational vehicle. The camper top cannot be raised or lowered until the ignition key is in place and a switch for the screw jacks is activated, thereby providing security.

4 Claims, 5 Drawing Figures

LIFTABLE TOP FOR PICKUP TRUCKS

BACKGROUND OF THE INVENTION

Elevatable tops or canopies for pickup truck cargo boxes are known. Some examples of the prior art are contained in U.S. Pat. Nos. 3,155,423; 3,447,830 and 3,765,716. These prior art structures have not been widely accepted for a number of reasons. Among the more important reasons working against commercial acceptance are excessive cost of manufacturing and installation and unduly complex operating mechanisms. Some of the prior art camper top operating mechanisms involve scissor-type linkages which can be hazardous to users. A further drawback of known prior art structures is the necessity for drilling, cutting or otherwise altering the pickup truck cargo box when installing the elevatable top. This promotes rusting and lessens the longevity of the cargo box.

The general objective of the present invention is to overcome the above and other drawbacks of the prior art through the provision of a pickup truck cargo box top which is supported and operated by a system of power-operated vertical axis screw jacks installed in existing side board mounts of the cargo box. The arrangement is highly simplified, reliable in operation and eliminates the necessity for drilling or otherwise cutting the metal cargo box of the pickup truck, thereby preventing any acceleration of rusting as a result of utilizing the invention.

Another object of the invention is to provide a lift top for pickup truck cargo boxes which furnishes security in that the top can only be operated while the truck ignition key is in place and the control switch for the motor-driven screw jacks is turned on. This security eliminates the need for costly built-in tool boxes in pickup truck cargo beds which are primarily designed for security reasons.

Still another object of the invention is to provide a lift top for pickup truck cargo boxes which is equipped with pull-down side curtains, facilitating conversion of the vehicle to a true recreational vehicle.

Other features and advantages of the invention will become apparent during the course of the following detailed description.

DETAILED DESCRIPTION

Figure 1:
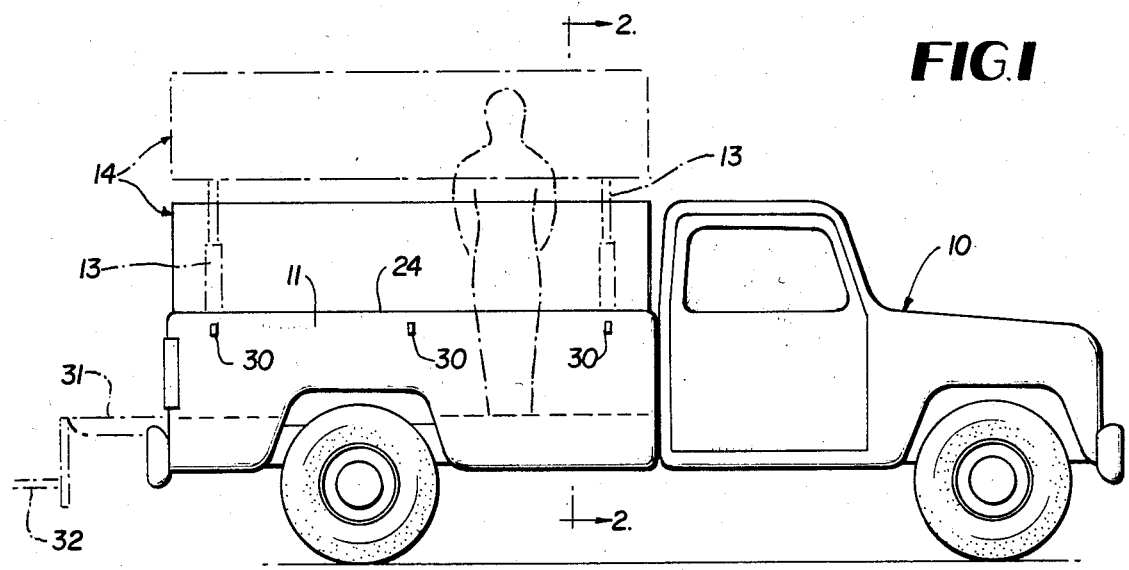
FIG. 1 is a side elevation of a pickup truck equipped with a liftable cargo box top according to the present invention.

Referring to the drawings in detail wherein like numerals designate like parts, a pickup truck 10 includes a cargo box 11 to which the present invention is applied. The two side walls of the cargo box 11 contain built-in hollow vertical mounts 12 for side boards, not shown. These side board mounts are utilized for the installation of four vertical axis screw jacks 13 in the present invention, as will be further described. The pickup truck 10 is conventional and its further details of construction are unimportant to a proper understanding of the invention.

Figures 2, 3, 5:
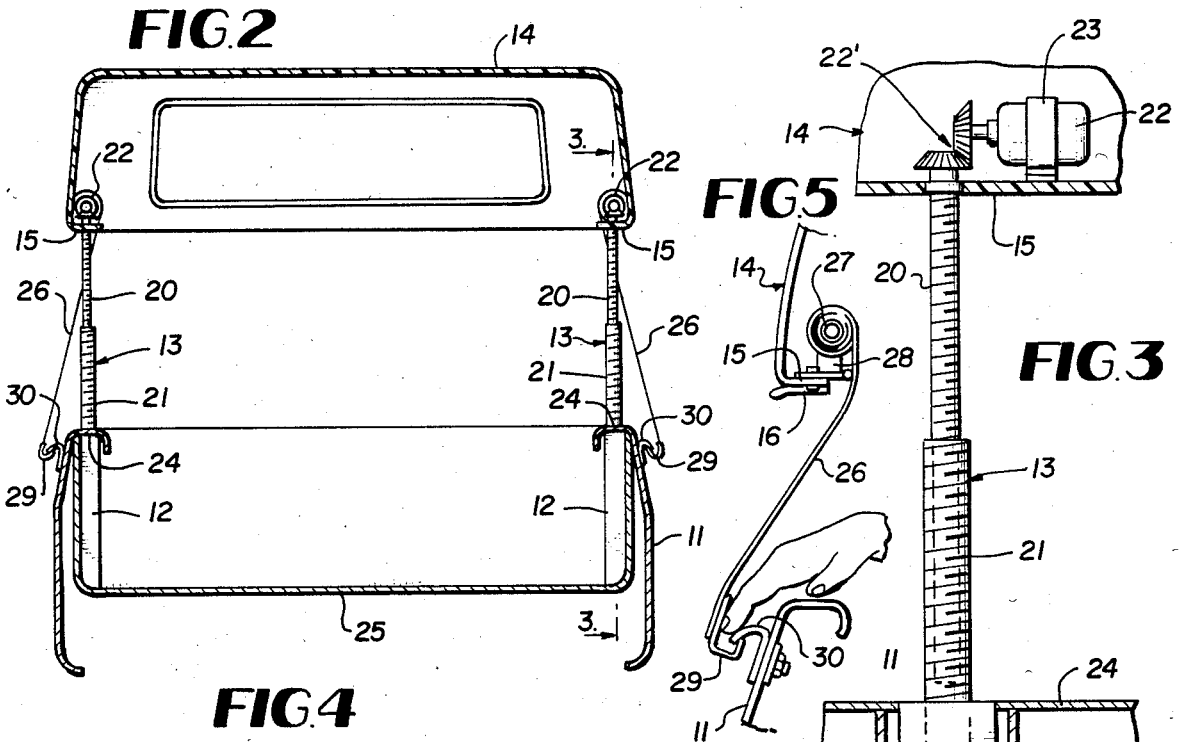
FIG. 2 is a vertical section taken on line 2—2 of FIG. 1.
FIG. 3 is an enlarged fragmentary vertical section taken on line 3—3 of FIG. 2.
FIG. 5 is a fragmentary vertical section taken through one side curtain and associated elements.

A camper top 14 or canopy of any conventional type includes a bottom continuous marginal flange 15 along its two sides and front, and this flange is equipped with a weather seal 16, as best shown in FIG. 5.

The bases 17 of the four screw jacks 13 are engaged in anchoring sockets 18 provided at the bottoms of the side board mounts 12 and may be secured by pins 19 or the like. The screw jacks 13 per se are conventional and each includes an upper smaller screw shaft 20 operatively engaged with a lower larger screw shaft 21, the latter being threadedly engaged in the non-rotatable base 17 held by the socket 18.

Each upper screw shaft 20 is driven by a horizontal axis drive motor 22 through bevel gears 22' or the like. Each motor 22 is held by a bracket 23 fixed on one horizontal flange 15 of camper top 14. The four screw jacks 13 and their drive motors are located near the corners of the cargo box 11 and camper top. The four motors are operated in unison under control of a switch, not shown, conventionally located in the cab of the pickup truck 10. The motors 22 cannot be operated until the ignition switch for the truck is in place. The motors 22 are powered conventionally by the electrical system of the truck.

The screw jacks 13 operate in a well known manner. When the motors 22 are running, rotation is imparted to the upper screw shafts 20 to raise or lower the camper top 14 which is directly supported through the brackets 23 on the jack motors 22. When the screw shafts 20 have been fully extended or retracted relative to the larger screw shafts 21, the latter begin to rotate within the bases 17 to complete the raising or lowering of the camper top 14. The camper top can be elevated a full thirty inches above the top flange 24 of the truck cargo box 11. Since the flange 24 is twenty-four inches above the floor 25 of the cargo box and the camper top measures twenty-four inches in height above its flange 15, a six-foot person can stand erect in the space between the floor 25 and the roof of the camper top 14 to facilitate the handling of cargo or during use of the truck as a recreational vehicle.

When the camper top 14 is fully lowered, the weather seal 16 engages the top flange 24 of the cargo box 11.

To further facilitate using the structure as a camper, side pull down/roll up curtains 26 are provided. The rollers 27 for these side curtains are fixed on the bottom flange 15 of the camper top 14 between the pairs of motors 22 through suitable mounting brackets 28, FIG. 5. The free ends of the curtains 26 carry hook plates 29 which are releasably engageable with hook retainers 30 attached to the side walls of the cargo box 11 near its top.

Figure 4:
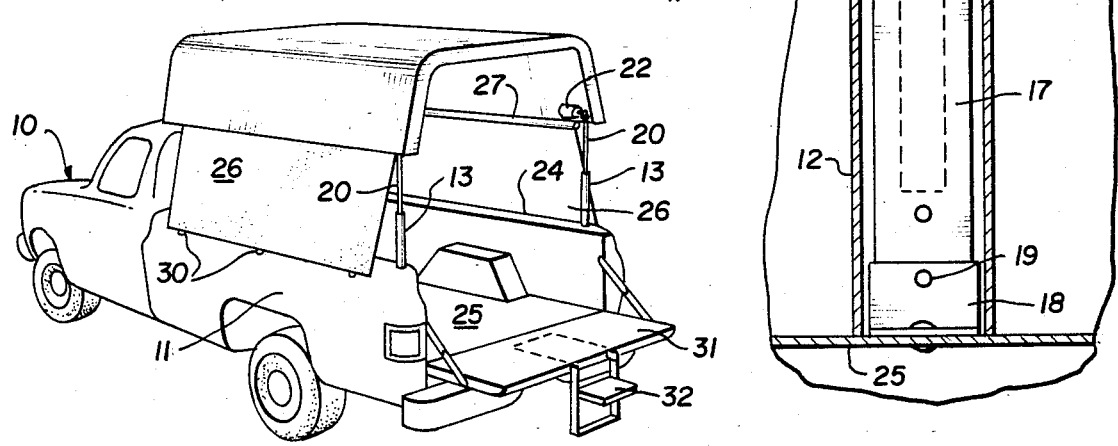
FIG. 4 is a perspective view of the invention with the cargo box top elevated and side curtains pulled down to form a camper enclosure.

For further convenience of use, the truck tailgate 31 can be equipped with a fold up/slide in step 32, as shown. When folded, this step is housed out of the way within a compartment provided in the tailgate. When the tailgate is in its closed vertical position, its top edge will be engaged by a weather seal at the bottom of the rear window structure of the camper top 14, the details of which are omitted for simplicity of illustration. This rear window structure is removable to provide an unobstructed 78 inch high passageway into the rear of the cargo bed, as depicted in FIG. 4. This arrangement greatly facilitates the handling of cargo. Without the benefits of the liftable camper top 14, cargo handlers or occupants of the cargo box are forced to work on hands and knees, or squatting in a space approximately 43.5 inches high.

Because of the security provided by the liftable top and its power drive means, the need for a costly built-in storage box commonly found in pickup trucks is eliminated, thereby providing increased storage space for other purposes.

The many advantages of the present invention over the known prior art should now be apparent to those skilled in the art without the need for further description. The invention is applicable to existing pickup trucks or to newly manufactured trucks. It is very simple, compact, safe in its construction and operation, reliable and convenient to operate.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. In a pickup truck or like vehicle, a cargo box having side walls and hollow side board mounts within the side walls, vertical axis screw jacks having bases installed within said side board mounts, a camper top for said cargo box, drive motors for the screw jacks operatively coupled to said jacks and being fixedly attached to the camper top, whereby the camper top is bodily supported on and raised and lowered by the screw jacks, the screw jacks and drive motors being four in number and being disposed adjacent to the four corners of the cargo box and camper top, and opposite side bottom horizontal longitudinal flanges on the camper top, said drive motors comprising horizontal axis motors, gearing operatively connecting the shafts of said motors with said screw jacks, and brackets fixedly holding said motors on the camper top and being secured to said flanges.

2. In a pickup truck or like vehicle as defined in claim 1, and pull down/roll up side curtains on the camper top, and cooperative means on the curtains and side walls of the cargo box to releasably secure said curtains in pulled down use positions.

3. In a pickup truck or like vehicle as defined in claim 1, and weather strip means carried by the bottom faces of said bottom horizontal longitudinal flanges of the camper top and adapted to sealingly engage opposing faces of the cargo box when the camper top is in a full down position.

4. In a pickup truck or like vehicle having a cargo box, a camper top for the cargo box, a system of vertical axis screw jacks having bases installed in the side walls of the cargo box and having screw shafts connected with and supporting the camper top bodily and being operable to raise and lower the camper top relative to the cargo box, drive motors for said screw shafts drivingly coupled therewith and being attached to and carrying the camper top, said drive motors being attached to bottom horizontal opposite side flanges of the camper top through brackets which embrace the drive motors and are secured to said flanges of the camper top.

* * * * *